(No Model.)

P. W. FERGUS.
ROAD CART.

No. 423,143. Patented Mar. 11, 1890.

WITNESSES:
Paul Jahel
C. Sedgwick

INVENTOR:
P. W. Fergus
BY Munn & Co
ATTORNEYS.

UNITED STATES PATENT OFFICE.

PATRICK W. FERGUS, OF MINEOLA, NEW YORK.

ROAD-CART.

SPECIFICATION forming part of Letters Patent No. 423,143, dated March 11, 1890.

Application filed July 26, 1889. Serial No. 318,788. (No model.)

*To all whom it may concern:*

Be it known that I, PATRICK W. FERGUS, of Mineola, in the county of Queens and State of New York, have invented a new and Improved Road-Cart, of which the following is a full, clear, and exact description.

My invention has for its object to provide an improved road-cart in which the "horse motion" will be reduced to a minimum irrespective of the condition of the roads traveled over, and thus promote the comfort of the occupants of such vehicles.

The invention consists in certain novel features of construction and combinations of parts of the road-cart running-gear, all as hereinafter described and claimed.

Reference is to be had to the accompanying drawings, forming a part of this specification, in which similar letters of reference indicate corresponding parts in all the figures.

Figure 1:
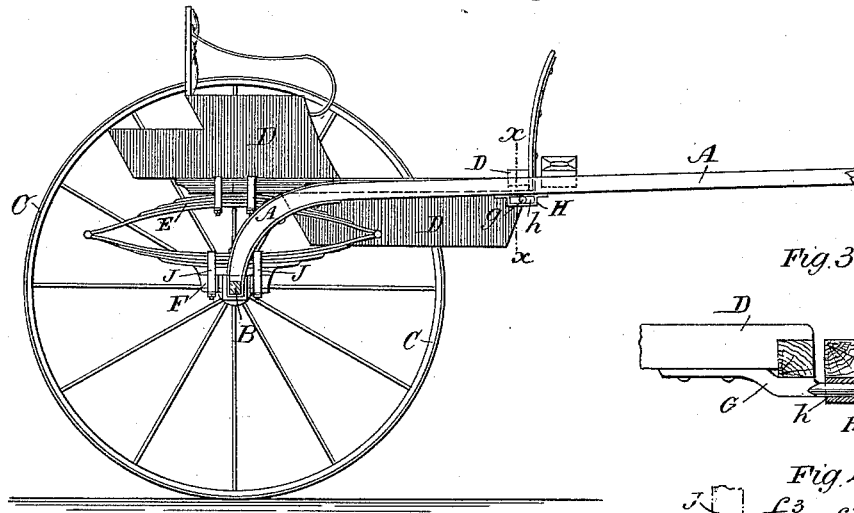
Figure 3:
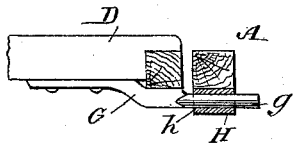
Figure 2:
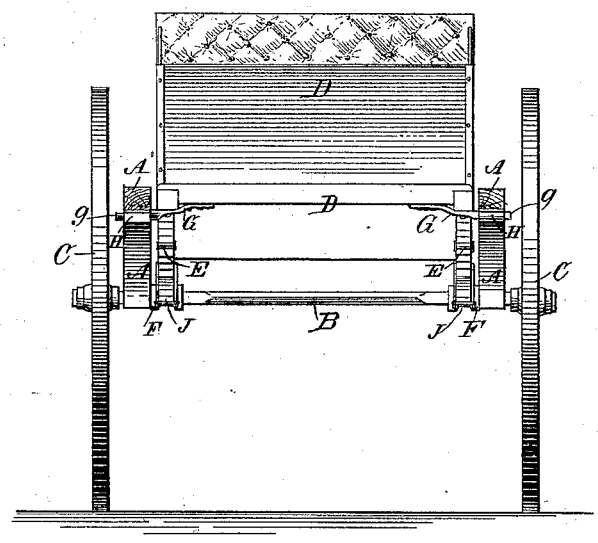
Figure 4:
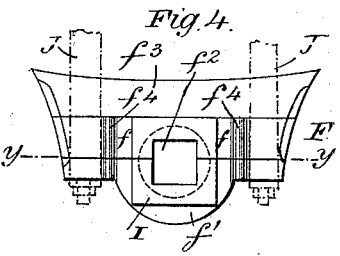
Figure 5:
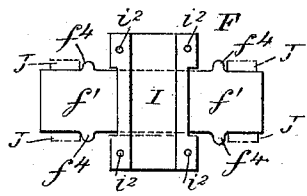
Figure 6:
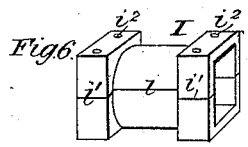

Figure 1 is a side elevation of my improved road-cart with one wheel removed and the axle in section and the shafts partly broken away. Fig. 2 is a front view of the cart with the shafts in section. Fig. 3 is an enlarged detail cross-section, showing the forward connection of the cart-body and shafts, and taken on the line $x\,x$ in Fig. 1. Fig. 4 is an enlarged side elevation of the cart-body spring-and-axle coupling, with the clips shown in part in dotted lines. Fig. 5 is a plan view of the lower half of the coupling, taken on the line $y\,y$ in Fig. 4; and Fig. 6 is a perspective view of the interior axle-bearing of the coupling.

The shafts A A of the road-cart are fixed to the axle B, on which the wheels C C are loosely placed and retained in any ordinary or approved manner.

The cart-body D has support from the axle by means of springs E, preferably elliptical leaf-springs, and a rocking coupling F, presently described, and at its forward end the body is connected to the shafts by means of a couple of irons G G, which have rounded outer end pins $g$, projecting outward laterally from the body-frame and entering longitudinal slots formed in or provided by metal keepers H H, which are fixed to the under sides of the shafts about in line vertically with the dash or foot board of the cart-body.

These slots $h$ allow forward and backward play of the pins $g$ in them as the cart-body rocks on the axle. The pins will preferably be provided with anti-friction rollers held in place by suitable washers and nuts.

In its preferred form the coupling F is made with two metal parts $f\,f'$, having at their joint face a round hole $f^2$, which receives the central rounded part $i$ of the bearing I, which is likewise made in two halves, and is provided with a squared central opening, which fits snugly upon the squared part of the cart-axle under the spring E. The bearing I is provided with squared end parts $i'\,i'$, which hold it against lateral displacement from the parts $f\,f'$ of the coupling, and these parts $i'\,i'$ are provided with holes $i^2$ to receive pins or screws to hold them together and to the axle. Above the top part $f$ of the coupling F is placed a wooden block $f^3$, the top face of which may be readily cut or shaped to conform to the curvature of the preferred elliptical spring E or of any other suitable spring used on the cart. The opposite side faces of the parts $f\,f'$ of the coupling F are provided with ribs or projections $f^4$, which serve as guides and stops to the clips J J, which secure the coupling around the axle and to the spring of the cart and prevent slip or displacement of the clips on the coupling. The position of the clips relatively to the coupling is indicated in dotted lines in Figs. 4 and 5 of the drawings. With the coupling F thus made in two parts $f\,f'$ and provided with a halved axle-bearing I provision is made for applying the coupling to the square portion of the axle and to the spring of any old cart, as well as to new vehicles.

It is obvious with the cart-body springs having mutual rocking coupling-connections at F with the axle and with the front body-connections G H, allowing forward and backward and backward movement of the body, that as the shafts are moved up and down a little by the horse the axle will simply turn a little in the couplings F, or will turn the bearings I in said couplings and allow the back portion of the body to remain practically at rest vertically, and at the same time will allow the body to sway forward and backward more or less, while the pins $g$ of the irons G slip in the keepers H should the cart-wheels strike a stone or rough place in the road, and immediately the obstruction is passed the springs will move the body easily and without jerk or shock back to normal position, and the body-pins $g$ then lie about at the lengthwise center of the slots of the keepers H, as shown in Fig. 1 of the drawings.

It will be noticed that the pins $g$ have little or no vertical play in the keepers H, while they have free backward and forward motion therein. This lack of vertical movement is an important advantage, as in other carts the bodies of which are sustained at the front by springs the passage of the wheels over an obstruction or irregularity of the road initiates a more or less violent vertical rocking motion of the body, which is prolonged by the inherent elasticity of the springs, and a far greater rocking motion is given the body than could be caused by the comparatively slight rise and fall of its front portion due to the direct connections G H of the body and shafts.

When as in my improvement the springs and shafts are coupled so as to allow independent mutual rocking of the body-springs and axle, and the forward connections of the body and shafts have little or no vertical play, but are allowed free forward and backward adjustment, the horse-motion is reduced to a minimum irrespective of the condition of the roads, and ease and comfort of the occupant of the vehicle are assured, as has been amply demonstrated in practical use of the road-cart. Furthermore, there is very little friction of the saddle on the horse's back, due to the free forward and backward movement of the vehicle-body independently of the shafts.

Having thus described my invention, what I claim as new, and desire to secure by Letters Patent, is—

1. In a road-cart, the body-springs having a rocking bearing on the axle, combined with longitudinally-ranging keepers on the shafts and pins on the body entering said keepers and having backward and forward play therein, substantially as herein set forth.

2. In a road-cart, the combination, with the axle and body-springs, of couplings consisting of blocks fitted on the axle and provided with exterior journals, bearings fitted on said journals, and clips holding the springs to the bearings and the journal-blocks to the axle, substantially as herein set forth.

3. In a road-cart, the combination, with the axle and body-springs, of couplings consisting of blocks fitted on the axle and provided with exterior journals, split or halved bearings fitted on said journals, and clips holding the springs to the bearings and the journal-blocks to the axle, substantially as herein set forth.

4. In a road-cart, the combination, with the axle and body-springs, of couplings consisting of split or halved blocks fitted on the axle and provided with exterior journals, split or halved bearings fitted on said journals, and clips holding the springs to the bearings and the journal-blocks to the axle, substantially as herein set forth.

5. In a road-cart, the combination, with the axle, springs, body, and shafts, of couplings consisting of blocks fitted on the axle and provided with exterior journals, bearings fitted on said journals, clips holding the springs to the bearings and the blocks to the axle, longitudinally-ranging keepers on the shafts, and pins on the body entering said keepers and having backward and forward play therein, substantially as herein set forth.

6. In a road-cart, the combination, with the axle, springs, body, and shafts, of couplings consisting of blocks fitted on the axle and provided with exterior journals, split or halved bearings fitted on said journals, clips holding the springs to the bearings and the blocks to the axle, longitudinally-ranging keepers on the shafts, and pins on the body entering said keepers and having backward and forward play therein, substantially as herein set forth.

7. In a road-cart, the combination, with the axle, springs, body, and shafts, of couplings consisting of split or halved blocks fitted on the axle and provided with exterior journals, split or halved bearings fitted on said journals, clips holding the springs to the bearings and the blocks to the axle, longitudinally-ranging keepers on the shafts, and pins on the body entering said keepers and having backward and forward play therein, substantially as herein set forth.

8. In a road-cart, the combination, with the axle, springs, body, and shafts, of couplings consisting of split or halved blocks I, fitted on the axle and provided with central exterior journals $i$ and opposite end shoulders or parts $i'\ i'$, split or halved bearings $f\ f'$, fitted on the block-journals, and clips holding the springs to the bearings and the blocks to the axle, substantially as herein set forth.

9. In a road-cart, the combination, with the axle, springs, body, and shafts, of couplings consisting of split or halved blocks I, fitted on the axle and provided with central exterior journals $i$ and opposite end shoulders or parts $i'\ i'$, split or halved bearings $f\ f'$, fitted on the block-journals, clips holding the springs to the bearings and the blocks to the axle, keepers H, providing longitudinal openings $h$ and fixed to the shafts, and pins $g$, held to the body and entering the keepers, substantially as herein set forth.

PATRICK W. FERGUS.

Witnesses:
SAMUEL J. JACKSON,
W. P. KELSEY.